L. WILLIS.
WHEEL.
APPLICATION FILED JULY 28, 1911.
1,148,268.
Patented July 27, 1915.
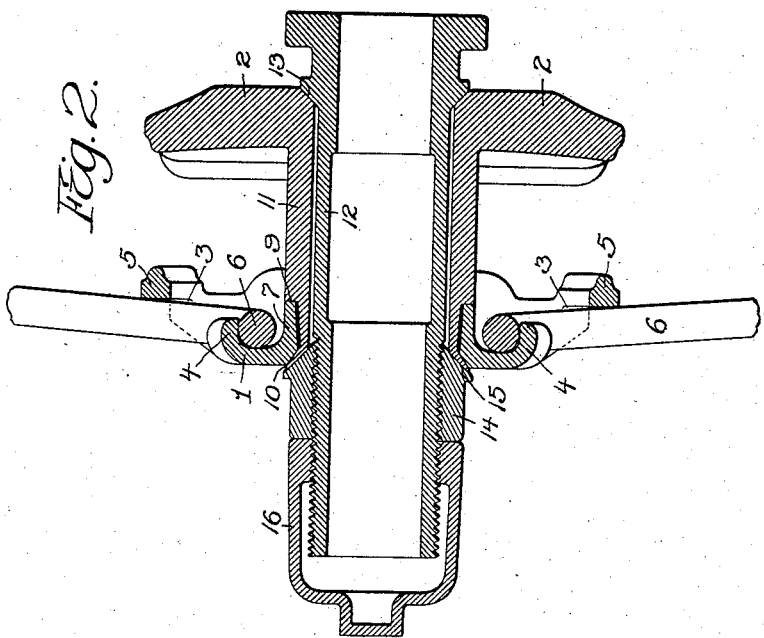
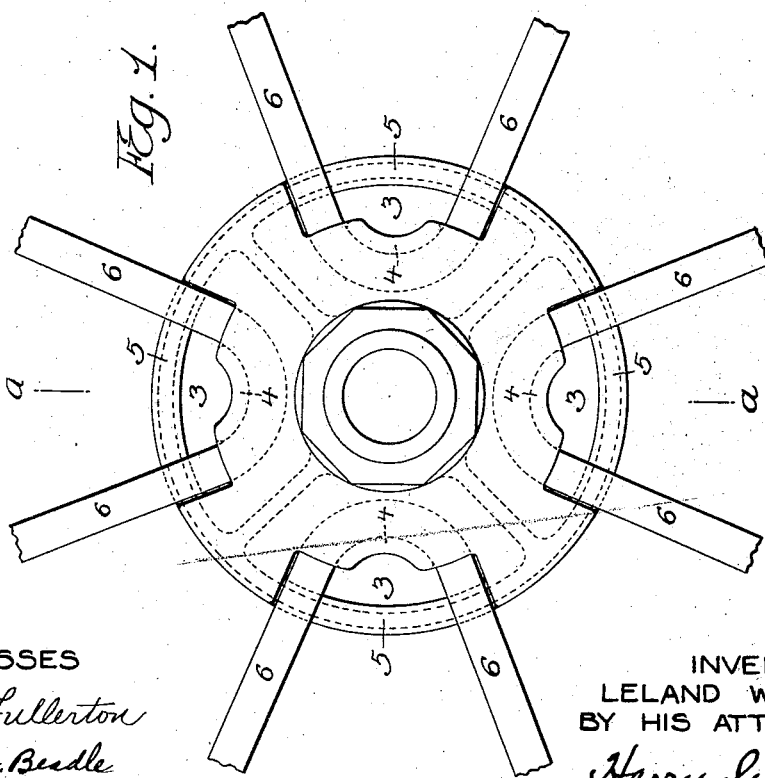
WITNESSES
Elsie Fullerton
Kate A. Beadle
INVENTOR
LELAND WILLIS
BY HIS ATTORNEY
Harry Smith

UNITED STATES PATENT OFFICE.

LELAND WILLIS, OF GRENLOCH, NEW JERSEY, ASSIGNOR TO BATEMAN MANUFACTURING COMPANY, OF GRENLOCH, NEW JERSEY, A CORPORATION OF NEW JERSEY.

WHEEL.

1,148,268.

Specification of Letters Patent.

Patented July 27, 1915.

Application filed July 28, 1911. Serial No. 641,008.

*To all whom it may concern:*

Be it known that I, LELAND WILLIS, a citizen of the United States, residing in Grenloch, New Jersey, have invented certain Improvements in Wheels, of which the following is a specification.

My invention relates to that class of wheels having a hub composed of opposite members with openings for the reception of the looped inner ends of what are termed "hair pin" spokes, said hub members also having lugs for engaging the loops and bearing surfaces for the legs of each spoke.

The object of my invention is to so construct such a wheel that it can be readily applied to or removed from the axle without affecting the rigid relation to one another of the hub members, and therefore without loosening or disturbing the spokes, and can be readily centered on the axle. This object I attain in the manner hereinafter set forth, reference being had to the accompanying drawing, in which—

Figure 1 is an end view of part of a wheel constructed in accordance with my invention, the spokes being applied to but one member of the hub, and Fig. 2 is a transverse section of the same on the line *a—a*, Fig. 1 with the addition of a grease cup thereto.

The hub of the wheel is composed of opposite heads, 1 and 2, each provided with openings 3, lugs 4, and bearing faces 5 for the inner looped ends of "hair pin" spokes, each leg 6 of the spoke being intended to be suitably secured, at its outer end, to the rim of the wheel.

The head 1 has a short hub member 7 which is securely clamped between shoulders 9 and 10 on the member hub 11 of the other head 2, as shown in Fig. 2, the hub members of the two heads being united by first slipping the member hub 7 of the head 1 over the reduced outer end of the member hub 11 of the head 2 and then swaging or expanding the outer end of said reduced portion of the member hub 11 so as to cause it to bear firmly against the outer face of the member hub 7 and press the inner face of said member hub 7 firmly against the shoulder 9 of the member hub 11. To the wheel hub thus constructed is adapted a bushing 12 which has, near its inner end, a shoulder 13 bearing against a seat surrounding the bore at the inner face of the head 2, said bushing being also threaded externally for the reception of a nut 14, which has a shoulder 15 seated against the flaring shoulder 10 which is formed at the outer end of the member hub 11 of the head 2 and serves to secure thereto the member hub of the head 1. By properly screwing up the nut 14, therefore, the bushing 12 is securely confined to the hub of the wheel, said bushing turning freely upon the axle to which the wheel is applied. The outer threaded portion of the bushing 12 carries a screw cap 16 which serves to retain the grease or other axle lubricant and to impart pressure thereto, if desired.

By preference, the shoulders 13 and 15 of the bushing 12 and nut 14, and their corresponding seats in the hub of the wheel, are coned or beveled whereby when the nut 14 is screwed up to position the bushing will be properly centered in respect to the hub of the wheel and the latter will run true upon the axle.

The bushing 12 has, at its inner end, a collar 17 which can be engaged by a suitable retainer on the axle or other portion of the vehicle so that when the cap 16 and nut 14 are unscrewed from the bushing the wheel can be removed without withdrawing the bushing from the axle.

I claim:—

1. The combination, in a wheel, of a bushing having thereon a conical flange and a nut with conical face, with a hub comprising two members one having at one end a conical seat for the flange of the bushing and at the other end a flange with conical outer face which constitutes a seat for the nut on the bushing, the inner face of the flange serving to lock the second member of the hub in engagement with the first.

2. The combination, in a wheel, of a bushing having thereon a conical flange and a nut with conical face, with a hub comprising two members, one having at one end a conical seat for the flange of the bushing and at the other end a flaring flange with conical inner and outer faces, with the outer face constituting a seat for the nut on the bushing and the inner face serving to lock the second member of the hub in engagement with the first.

In testimony whereof, I have signed my name to this specification, in the presence of two subscribing witnesses.

LELAND WILLIS.

Witnesses:
HARRY SNYDER,
R. F. TYSON.